No. 794,344. PATENTED JULY 11, 1905.
W. S. COFFMAN.
CORN POPPER.
APPLICATION FILED DEC. 9, 1904.

2 SHEETS—SHEET 1.

Will S. Coffman, Inventor.

Witnesses
by C. A. Snow & Co.
Attorneys

No. 794,344. PATENTED JULY 11, 1905.
W. S. COFFMAN.
CORN POPPER.
APPLICATION FILED DEC. 9, 1904.
2 SHEETS—SHEET 2.
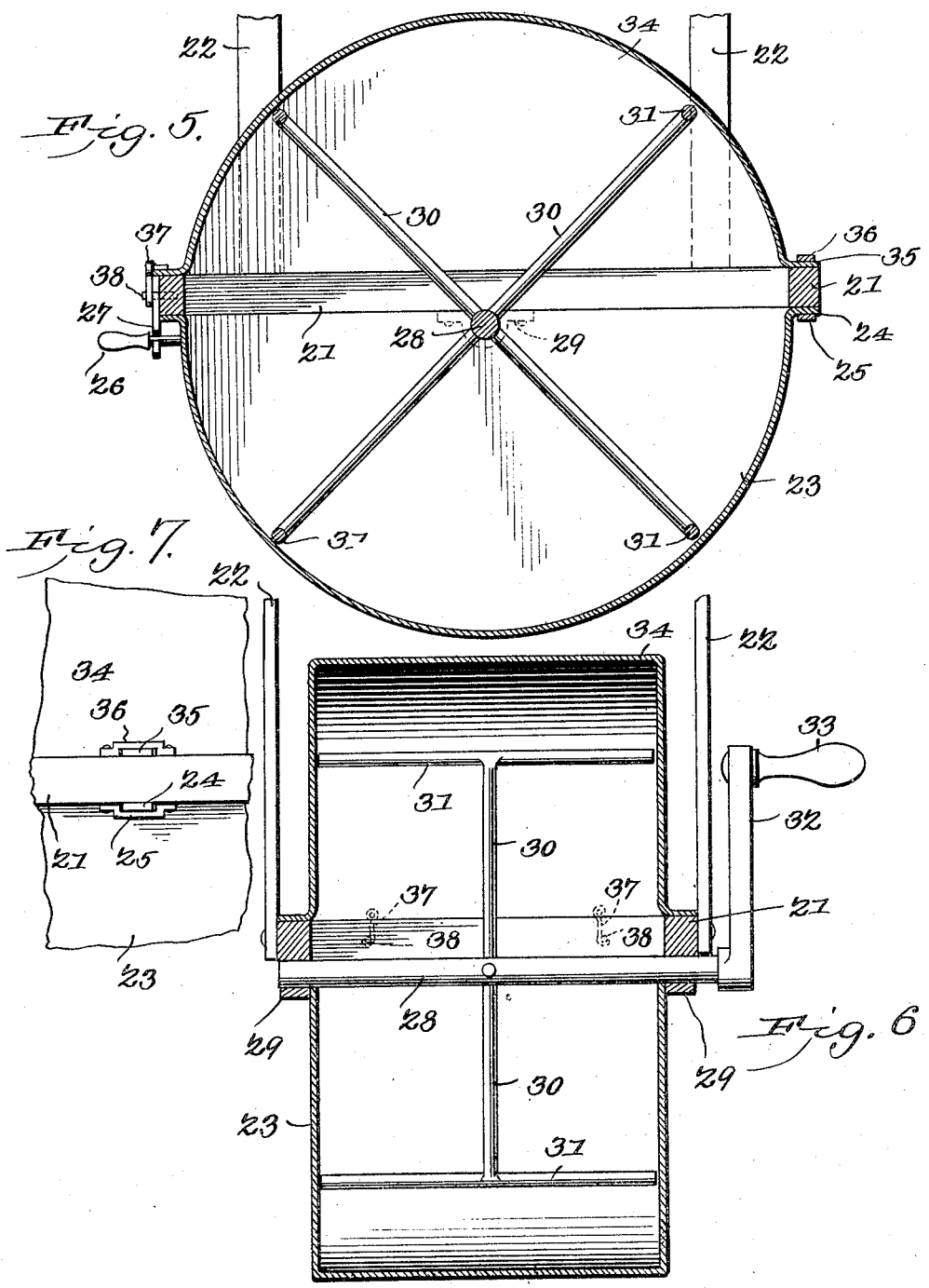
Witnesses
Will S. Coffman, Inventor.
by C. A. Snow & Co.
Attorneys No. 794,344.

Patented July 11, 1905.

UNITED STATES PATENT OFFICE.

WILL STOCKS COFFMAN, OF OKLAHOMA, OKLAHOMA TERRITORY.

CORN-POPPER.

SPECIFICATION forming part of Letters Patent No. 794,344, dated July 11, 1905.

Application filed December 9, 1904. Serial No. 236,194.

*To all whom it may concern:*

Be it known that I, WILL STOCKS COFFMAN, a citizen of the United States, residing at Oklahoma, in the county of Oklahoma and Territory of Oklahoma, have invented a new and useful Corn-Popper, of which the following is a specification.

My invention relates to corn-poppers, and has for its objects to produce a simple inexpensive device of this character in which the corn will during the popping operation be constantly agitated and may after popping be readily discharged.

To these ends the invention comprises the novel features of construction and combination of parts more fully hereinafter described.

Figure 3:
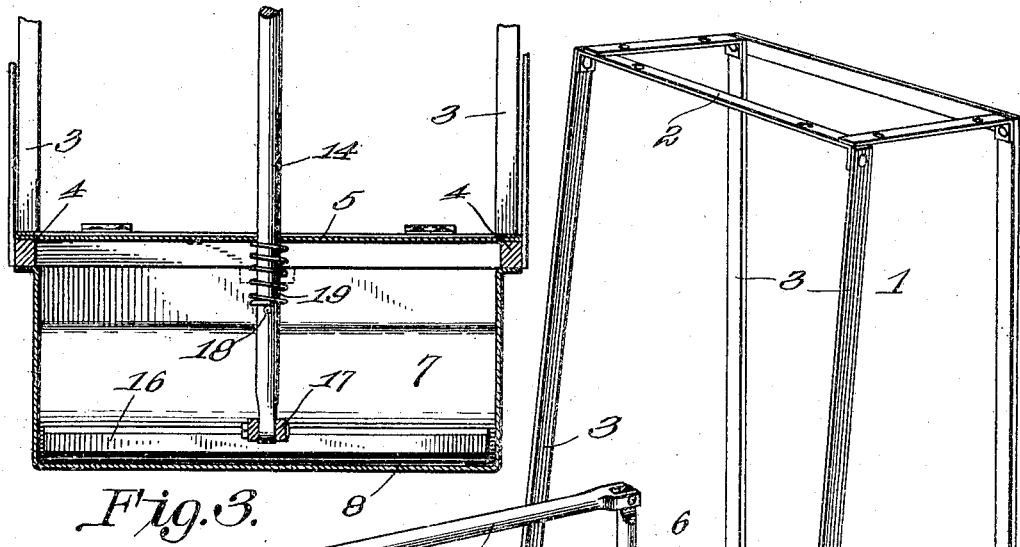
Figure 1:
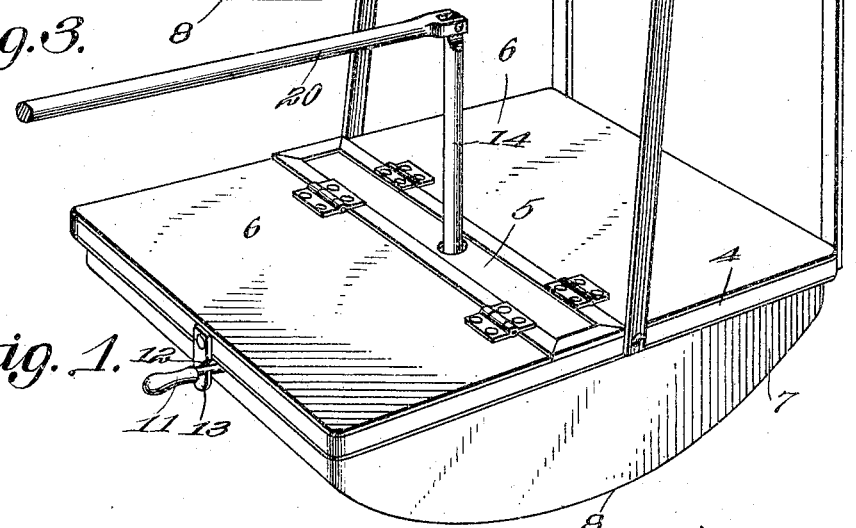
Figure 2:
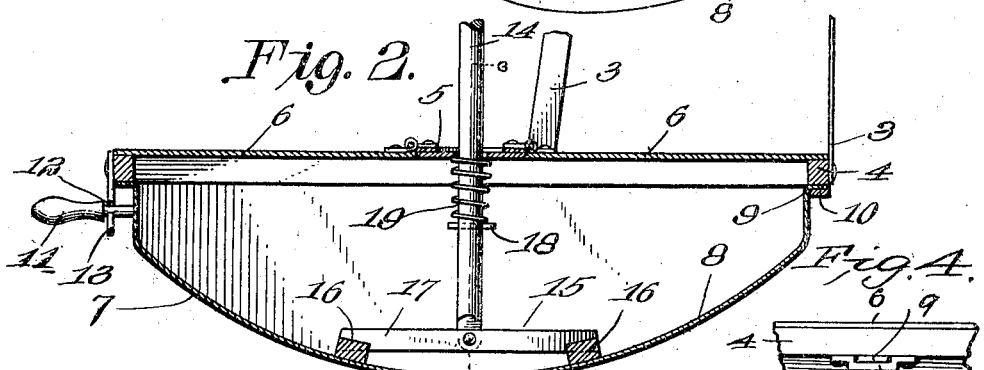
Figure 4:

In the accompanying drawings, Figure 1 is a perspective view of a device embodying my invention. Fig. 2 is a vertical longitudinal section through the same. Fig. 3 is a transverse section on the line 3 3 of Fig. 2. Fig. 4 is a detail elevation illustrating the means for detachably connecting one end of the pan to the supporting-frame. Fig. 5 is a detail longitudinal sectional view of another embodiment of the invention. Fig. 6 is a sectional view at right angles to Fig. 5. Fig. 7 is a detail elevation showing the manner of detachably connecting the pan and the cover to one end of the frame.

Referring to the drawings, 1 designates a primary supporting-frame comprising a horizontal member 2, adapted for attachment to the top of a wagon or other overhead support, and a plurality of vertically-disposed members 3, connected at their upper ends with the member 2 and at their lower ends with a secondary frame 4.

The frame 4, which is preferably of rectangular form, is provided adjacent to its longitudinal center with a transverse bar 5, to which is pivoted a pair of oppositely-extending substantially horizontal leaves 6, adapted to swing upward in a vertical plane and constituting the lid or cover for a corn receptacle or pan 7.

The pan 7, which, as herein shown, preferably comprises suitable side and end walls and a longitudinally downwardly curved bottom 8, is provided upon one of its end walls with a horizontal engaging member or tongue 9, adapted to enter a socket or seat 10 provided in the rear end bar of frame 4, and on its other end wall with a horizontally-extending handle 11, a portion of which is formed to rest in a laterally-opening socket or seat 12, formed in a vertically-depending bracket 13, provided on the front end bar of frame 4. It is apparent from this arrangement that the receptacle 7 may be readily and detachably engaged with the frame 4 by inserting the tongue 9 in socket 10 and seating the handle 11 in socket 12 and that when in said position the leaves 6 will effectually close the otherwise normally open side of the pan, it being obvious that said leaves may be swung upward when temporary access to the pan is desired during the corn-popping operation.

Provided adjacent to the center of bar 5 is a suitable bearing-opening, in which is loosely mounted for rocking motion a vertically-disposed shaft 14, to the lower end of which there is loosely connected an agitating member or sweep 15, adapted in practice to travel over the surface of the pan-bottom 8 and stir the corn while being popped. The agitator 15 consists, preferably, of a pair of transversely-disposed bars or members 16, arranged in spaced parallel relation, and a longitudinally-arranged connecting bar or member 17, to the opposite ends of which the members 16 are respectively attached.

Arranged upon the shaft 14 and having bearing at its upper end beneath the bar 5 and at its lower end upon a pin or other fixed stop 18, provided on the shaft, is an expansion-spring 19, designed in practice to press the shaft longitudinally downward and maintain the agitator 15 in contact with the bottom of the pan, thereby preventing the former from overriding and crushing the corn.

The upper end of shaft 14 is pivotally connected with a link or its equivalent 20, which in turn is connected with an engine or other suitable source of power for transmitting motion to the shaft during the operation of the device.

Another embodiment of the invention has been shown in Figs. 5 to 7, inclusive, wherein the rectangular substantially horizontal frame 21 is the same as the frame 4 in the previously-described form and is provided at opposite sides with pairs of standards 22 rising therefrom for the purpose of hanging the frame from an overhead support. The pan 23 differs from the pan 8 in that it is substantially semicircular in shape and is provided at its rear end with an external tongue or projection 24, detachably engaged with a seat or socket 25, preferably formed by a loop or bracket secured to the under side of the frame 21. The opposite end of the pan is provided with a handle 26, which is designed for detachable engagement with a seat or keeper 27, depending from the front of the frame. By this means the pan may be readily removed from the frame by first disengaging the handle 26 from the keeper 27 and then withdrawing the projection 24 from the seat 25, the pan of course being entirely manipulated by the handle, so as to avoid contact of the hands of the operator with the heated pan.

Across the top of the pan is a substantially horizontal shaft 28, mounted in suitable bearings 29, carried by the frame 21, and from this shaft extend substantially radial arms 30, which are provided at their outer ends with cross heads or bars 31, which work across the bottom of the pan and constitute agitating means for agitating the corn within the pan during the popping thereof. The shaft 28 projects externally of the frame and may be driven by power or by hand, the present embodiment of the invention having a crank 32 upon one extremity of the shaft and a hand-grasp 33 upon the crank for convenience in manually rotating the agitator.

The cover 34 is substantially semicircular in shape and rests upon the top of the frame 21, the rear end of the cover being provided with a projection 35 to detachably engage a seat or socket 36, provided upon the top of the rear of the frame 21, while its front end is provided with a pair of swinging hooks 37 to engage suitable keepers or projections 38 upon the front of the frame and thereby detachably hold the cover in place.

From the foregoing description it will be noted that each embodiment of the invention includes a substantially horizontal open frame having hangers rising therefrom to suspend the device from an overhead support, there being a corn-receiving pan detachably hung from the frame, an agitator working within the pan, and a cover upon the top of the frame to give access to the interior of the pan without removing the latter from the frame. Furthermore, each pan is arranged to be removed from the frame independently of the cover and other parts of the device, whereby the popped corn may be removed and the pan recharged without interfering with any of the other parts of the device, and the pan is provided with a handle for use in applying and removing the pan without danger of the operator's hands coming into contact with the heated pan.

It will now be apparent that the device of the present invention is exceedingly simple, inexpensive, and will admirably perform its functions; but it is to be understood that I do not limit myself to the precise details herein set forth, as minor changes may be made within the scope of the claims without departing from the spirit of the invention.

Having fully described the invention, what is claimed is—

1. In a device of the class described, the combination of a substantially horizontal frame, means for supporting the frame in an elevated position, seats at the front and back of the frame, a pan provided at one end with a projection for detachable engagement with one of the seats and having a handle at its other end for detachable engagement with the other seat, and a cover supported upon the frame independently of the pan.

2. In a device of the class described, the combination of a substantially horizontal frame, hangers rising from the frame, a pan detachably hung from the frame, and a cover supported upon the frame independently of the pan.

3. In a device of the class described, the combination of a substantially horizontal frame, means for supporting the frame in an elevated position, a pan removably hung from the frame, a cover supported upon the frame independently of the pan, and an agitator adapted to work within the pan.

4. In a device of the class described, the combination of a substantially horizontal frame having seats at the front and rear thereof, hangers rising from the frame, a pan provided at one end with a projection detachably engaging the adjacent seat and having a handle at its opposite end for detachable engagement with the other seat, an agitator adapted to work within the pan, and a cover supported upon the frame independently of the pan.

In testimony that I claim the foregoing as my own I have hereto affixed my signature in the presence of two witnesses.

WILL STOCKS COFFMAN.

Witnesses:
J. W. Thomas,
J. W. Black.